United States Patent
Vidal

[19]
[11] 3,887,208
[45] June 3, 1975

[54] COLLAPSIBLE AND PORTABLE UTILITY CART

[76] Inventor: Paul Vidal, 8409 14th Ave., Langley Park, Md. 20783

[22] Filed: Jan. 18, 1974

[21] Appl. No.: 434,688

[52] U.S. Cl. .............................. 280/36 C; 280/47.25
[51] Int. Cl. ............................................. B62b 1/10
[58] Field of Search ........ 280/36 C, 63, 47.17, 47.2, 280/47.18, 47.24, 47.25, 47.26

[56] References Cited
UNITED STATES PATENTS

| | | | |
|---|---|---|---|
| 404,494 | 6/1889 | McBoyle | 280/47.25 X |
| 1,046,663 | 12/1912 | Sleffel | 280/47.25 |
| 1,486,655 | 3/1924 | Gourley | 280/47.24 |
| 2,582,143 | 1/1952 | Maas | 280/36 C X |
| 3,726,536 | 4/1973 | Arino | 280/47.25 X |
| 3,741,586 | 6/1973 | Wiczer | 280/36 C X |

*Primary Examiner*—David Schonberg
*Assistant Examiner*—Michael J. Forman
*Attorney, Agent, or Firm*—John E. Becker

[57] ABSTRACT

A collapsible, portable, hand-pullable two-wheeled utility cart adaptable to selectively transport small children or various baggage, luggage, shopping bags, and the like. The adjustable drawbar is provided with an adjustable extensible, swivel-type handle to reduce fatigue on the wrist and/or arm of the person pulling the cart, and is further provided with an articulated at-rest supporting leg serving also as an adjustable child's foot rest selectively pivotally foldable at two places. Additional features include adjustable hand grips for the child passenger; auxiliary hand pulls attachable to the drawbar to enable two persons to pull the cart; and extensible step-traversing roller mechanism to ease the cart down steps with less jolting; a luggage-stabilizing and supporting bracket removably attachable to the cart frame and drawbar; elastic tie-down cords for the baggage; and a universal type swivel adapter and bracket attachment to enable the cart to be towed by a bicycle or auto-type vehicle. The cart is compactly collapsible to facilitate both brief and extended travel by car, train, plane or bus without inconvenience to the owner or fellow travellers.

19 Claims, 21 Drawing Figures

3,887,208

COLLAPSIBLE AND PORTABLE UTILITY CART

BACKGROUND AND OBJECTS OF THE INVENTION

The present invention relates to a compactly portable handpullable two-wheeled combination utility cart and child's stroller type vehicle. More particularly, the invention relates to a compactly foldable, light weight multiple purpose utility and recreational vehicle serving a variety of purposes. There are many instances where objects, articles, an/or young children have to be handled and/or transported by a person in charge thereof. Home owners often need to move various smaller pieces of furniture and other objects including luggage, baggage, garbage cans and miscellaneous articles. Furthermore, the matter of carrying groceries or other purchases as well as small children often becomes very burdensome whereby a cart of the foregoing character is most useful.

Portable carts of the instant type are ideally suited for families with smaller children when the families are travelling frequently by car, train, subway, plane, bus of other similar means of transportation. Because of the uniquely compact character, the cart of this invention can be easily stored in the trunk of any car or compactly folded and carried by hand briefly when boarding subways, buses or the like, and also can be disassembled and stored within an overnight type travelling bag if desired for more extensive travel plans. A cart of this type is particularly useful when sight-seeing, which may entail short trips on busses from one area to another, and the compact design of the subject cart enables one to place it in front of him while riding a bus or subway without inconveniencing either himself of his fellow travellers. Likewise, the cart may be carried upon one's back if it is not desired to pull the cart all of the time.

It is a principle object of the present invention to provide a portable hand-pullable two-wheeled utility cart of the foregoing character which will provide on-the-spot convenience as well as pleasure and utility to the user and his child and/or items to be carried alternatively or at times even concurrently therewith. Such a cart relieves the user from the burdensome duty of having to end up carrying a child after a period of time during sight-seeing or other shopping trips when the child gets tired.

A further principle object of the invention is to provide a utility cart of the foregoing character which embodies an articulated at-rest supporting leg which also partially serves as an adjustable child's foot rest and is selectively foldable between at least two predetermined positions.

Another object of the invention is to provide a cart of the foregoing character which also embodies various accessories for increasing the overall utility of the cart, which accessories include adjustable hand grips for the child passenger; auxiliary hand pulls removably attachable to a drawbar assembly of the cart to enable two persons to pull the cart in side-by-side fashion; and extensible step-traversing roller-like mechanism to ease the cart down over steps or curbs with less jolting effect; luggage-stabilizing and supporting bracket means removably attachable to the cart frame and drawbar means; one or more elastic tie-down cords for better retention of baggage and the like when carried thereby; and extensible auxiliary drawbar telescopically connected with the basic or main drawbar, and provided with swivelling type handle grip means enabling the handle thereof to rotate 360° around the axis of the drawbar to reduce fatigue.

It is yet a further object of the invention to provide a cart of the foregoing character which includes universal type trailer hitch and trailer bracket means to enable the cart to be attached to the back of a bicycle or other type of pulling vehicle as desired. By the use of the auxiliary bracket means removably attachable to the main cart body, increased loads of baggage, and/or light weight boats preferably of the light weight inflatable type may be readily carried and towed on the subject utility trailer.

SUMMARY OF THE INVENTION

The foregoing and other objects and advantages of this invention are achieved generally by providing a light weight cart body provided preferably with only one pair of axially aligned wheels disposed beneath a generally planar first-supporting member. The cart body is further provided with an articulated at-rest supporting leg serving also as an adjustable child's foot rest, said leg being of composite form and pivotally moveable at two places to facilitate adjustment for different size children riding thereon. The first-mentioned generally planar supporting surface constitutes a basic seat portion for the child. This seat portion is preferably provided with a contiguous hingedly connected second planar support member also constituting a seat back rest, and is foldable between generally upright, right angular positions and substantially fully folded positions adjacent to the first-mentioned supporting member. The tow bar or drawbar means includes a longitudinally extended drawbar having one end adjustably connected to the cart body with means to vary the relative angle thereof, and an auxiliary drawbar telescopically extensibly attached to the first drawbar member to give an overall longer drawbar length to enable the drawbar assembly to lay more closely horizontal to the supporting surface when in use. The wheels of the cart are preferably of a solid hub type and protected by small fenders to preclude danger to a small child's hands which may otherwise become entangled therein.

An auxiliary supporting bracket is readily attachable to and detachable from the utility cart and drawbar assembly to provide auxiliary support forwardly beyond the first planar supporting member and at opposite sides of said drawbar means, to thereby increase the carrying utility and capacity of the cart as when carrying multiple pieces of luggage or baggage, and the like, having a collective area size greater than that of said first-mentioned planar supporting member.

The foregoing and other objects and advantages of the invention will become more apparent from the following detailed description taken in conjunction with the accompanying illustrative drawings. The drawings are for illustrative purposes only and are in no way intended to limit the scope of the invention to be defined in the appended claims.

BRIEF DESCRIPTION OF DRAWINGS

FIG. 12 is a further side elevational view showing an alternative use of the cart with the auxiliary frame attached for supporting plural pieces of baggage or the like;

FIG. 12a is a reduced scale side elevational view depicting a further manner of carting multiple pieces of luggage;

FIG. 13 is a top plan view of the cart of FIG. 12, but minus the luggage therewith to better show the auxiliary bracket means;

FIG. 14 is an enlarged cross-sectional view taken substantially on line 14—14 of FIG. 13 to show one method of attachment of the auxiliary bracket;

FIG. 15 is a perspective view of the auxiliary bracket alone, and as shown assembled with the cart in FIGS. 12, 13 and 14;

DETAILED DESCRIPTION OF PREFERRED EMBODIMENT

Briefly describing the invention with reference to the drawings, the cart assembly is generally designated C and includes a pair of wheels W supporting a cart body B and a seat and/or article supporting means S. The cart is pulled by a forwardly extending drawbar means D which embodies an articulated supporting leg L. Handle bar means H are adjustably attached to the drawbar means D for the benefit of child passengers when used as a stroller. The various components are either readily foldable, collapsible or dismantable to enable them to be compactly stored and/or carried in a travel bag or satchel T.

Referring in more detail to the drawings, the cart body B comprises a first generally rectangular planar supporting member 10 which constitutes part of the basic seat and support means S. Member 10 is provided with any suitable means such as depending wheel support brackets integrally formed side panels 12, 12. A pair of axially aligned stub axles or a single elongated axle can be attached to or through the side panels or brackets 12, 12, projecting sufficiently oppositely outboard thereof to receive the wheels W thereon. Said wheels W are preferably of a closed hub type and are protected on the upper sides by suitable fenders 14, 14 attached in any conventional manner to the cart body or members 10 or 12.

A second generally rectangular planar member 16, constituting a seat back or auxiliary support member, and preferably of the same approximate size as member 10 is hingedly connected thereto so as to be selectively foldable down over or closely contiguous to said seat member 10. While both of the members 10 and 16 may be padded for comfort, only the basic seat member 10 is shown with a padded cushion means 18.

The drawbar means D is of composite form and includes a basic relatively fixed, longitudinally elongated main drawbar 20 and a relatively movable, telescopically extensible and retractable auxiliary drawbar member 22. The main drawbar 20 preferably is the larger in diameter of the two bar portions, and is of hollow tubular form to slidably receive the auxiliary bar portion 22. Auxiliary bar portion 22 also is preferably of hollow tubular form so as to receive therein a still further telescopic elongated rod-like section 24, the latter of which is to be explained in more detail hereinafter.

Basic drawbar section 20 is preferably adjustably attached to the basic seat or support member 10 in any suitable manner. One feasible manner includes a transverse, rotatable sleeved body member 26 which is spaced forwardly of member 10 and is provided with a medial vertical aperture spaced a few inches from the inner end of the basic drawbar member 20 and through which aperture an assembly bolt is inserted as well as through a corresponding aperture in the basic drawbar member 20. A wing nut preferably is used to facilitate easy assembly and disassembly thereof. The innermost end of drawbar member 20 has an arcuate and preferably circular adjustment clamp 28 encircling or otherwise suitably attached to the correspondingly arcuate portion thereof. The clamp 28 is on the inner end of an adjustment screw 30, the latter being by a compression spring 32 which is interposed between the clamp 28 and a fixed yoke or bighted adjustment bracket 34 dependingly attached to the underside of said basic seat or cart body member 10. The other threaded end of the adjustment screw 30 is provided with a wing nut acting on the lowermost side of the fixed bracket 34. With the ends of the tubular transverse body member 26 affixed so as to permit rotation about its own axis, angular adjustment of the drawbar 20 can be affected by tightening or loosening the clamp screw means 28, 30 by means of its wing nut. A clearance cutout and/or tunnelway 29 (FIGS. 1 and 4) is shown in the illustrative drawings for the inner end of the drawbar 20, but it is understood that other modified structural relationships may be used to provide the necessary clearance and/or adjustment means.

The extensible drawbar member 22 is selectively extensibly adjusted by means of a spring biased detent 36 operable within any one of several adjustment holes provided in the basic drawbar member 20. The outer end of extensible drawbar member 22 is provided with a 360° freely rotatably sleeve 38 to which a pulling handle 40 is connected. This freely rotatably or swivel-like action greatly reduces fatigue on the arm of the person pulling the cart. Illustrative constructional details are shown in the enlarged detail FIG. 6. One feasible construction includes providing a reduced and threaded outer end of auxiliary drawbar member 22 so as to receive a handle-retaining nut 39 thereon, as shown. The third rod-like auxiliary drawbar extension member 24 has a sliding fit through the nut 39, and also through an aperture in the pulling handle 40. An ancillary pulling handle 40' is suitably attached and retained on the outermost end of rod 24. Handle 40' is adaptable to lay adjacent to and be operatively used together with handle 40, or separately when in a more forwardly extended condition. A further use of this auxiliary drawbar rod extension 24 and ancillary handle 40' will be described hereinafter.

The outer sleeve 38 and the concentric end portion of the draw bar member 22 are provided respectively with preferably diametrically aligned clearance apertures and threaded holes 38' (FIG. 6) to receive therein auxiliary towing handles 42 (FIG. 19) or auxiliary lateral support rods 44 (FIGS. 6 and 20), which when inserted preclude the rotatable swivel action of the handle. The handle 40 may be provided with further side apertures 41 (FIG. 6) which may also be threaded to alternately or supplementally receive the hand pulls 42, or lateral rod extensions 44.

Figures 1, 2, 3:
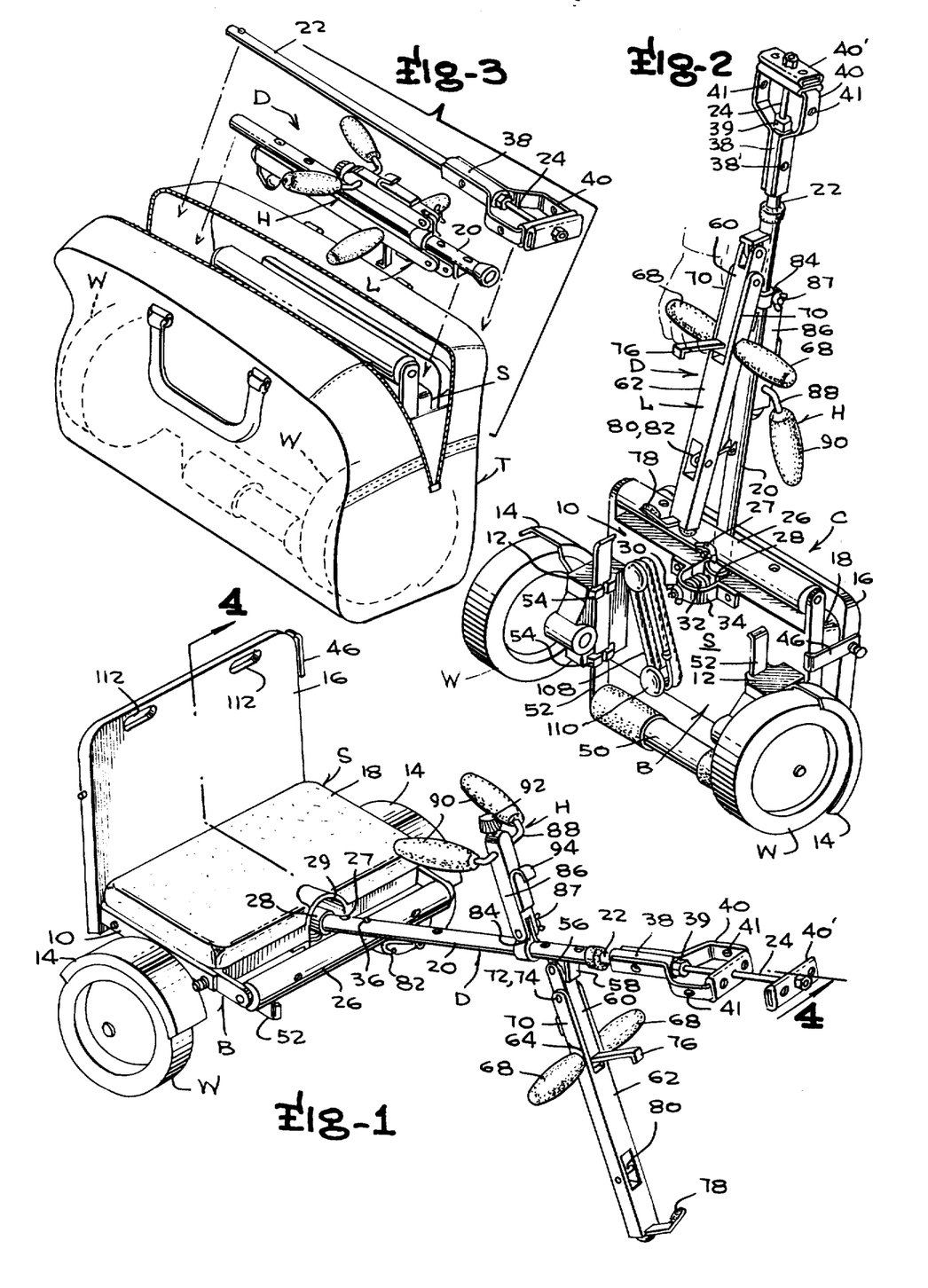
FIG. 1 is a perspective assembly view of the combination utility cart and child's stroller shown in a potential stroller use condition.
FIG. 2 is a different perspective view showing the cart in a more collapsed and upright condition ready for transporting by hand.
FIG. 3 is a perspective view showing the cart components in partially exploded relationship as they are being fitted into the carrying case.
Figures 8, 9, 11:
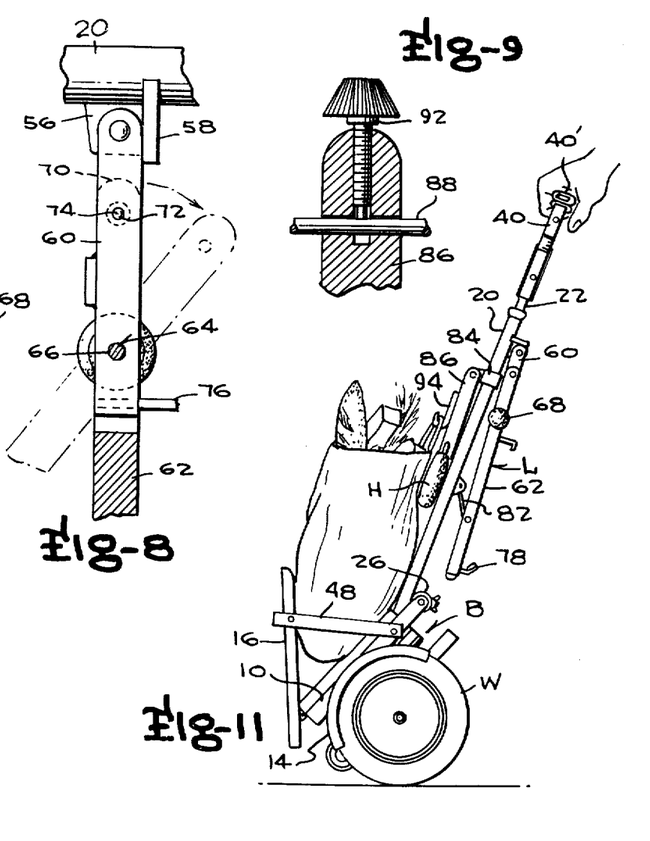
FIG. 8 is a further detailed view on the same scale as FIG. 7 and as viewed substantially on line 8—8 of FIG. 7.
FIG. 9 is a further fragmentary cross-sectional detailed view taken substantially on line 9—9 of FIG. 4.
FIG. 11 is further side elevational view of the cart shown in an upright use for carrying a shopping bag or the like thereby.

Suitable link means are used to hold the planar members 10 and 16 in various predeterminable positions. In FIG. 2, a relatively short link 46 is used to temporarily lock the two members 10, 16 together, whereas a longer link 48, as shown in FIG. 11, is provided to enable the second planar member 16 to be temporarily locked at an angle relative thereto. The utilitarian use for such a positioning of these members is shown is FIG. 11 wherein they at least partially support an article or shopping bag thereon.

Beneath the basic seat member 10, there are means provided to enable the cart to be more gently pulled down off steps or curbs. The means therefor include the provision of a rearwardly extensible step- or curb-engaging roller member 50 moveable by roller-support slide members 52 having a friction fit within complementary slide ways or brackets 54 provided on the wheel support brackets 12, 12.

Figures 4, 5, 6:
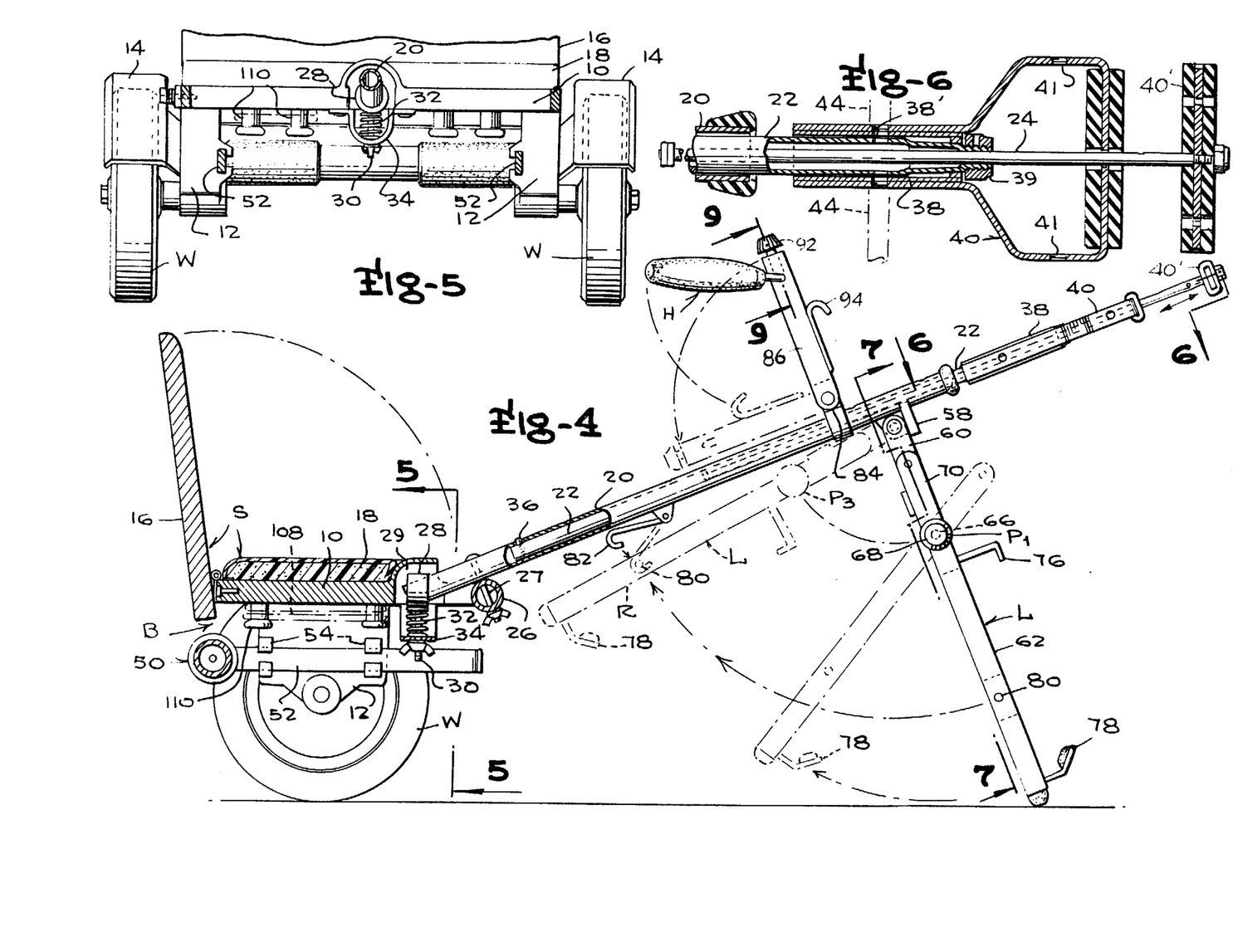
FIG. 4 is an enlarged longitudinal cross-sectional view taken substantially on line 4—4 of FIG. 1 and showing certain portions in elevation, with other portions shown in dash-dot outline depicting intermediate folded conditions of certain of the components.
FIG. 5 is a elevational view taken on the view line 5—5 showing the drawbar in cross-section.
FIG. 6 is a further enlarged detailed cross-sectional view taken substantially on line 6—6 through the telescopic and swivel portions of the handle.
Figure 7:
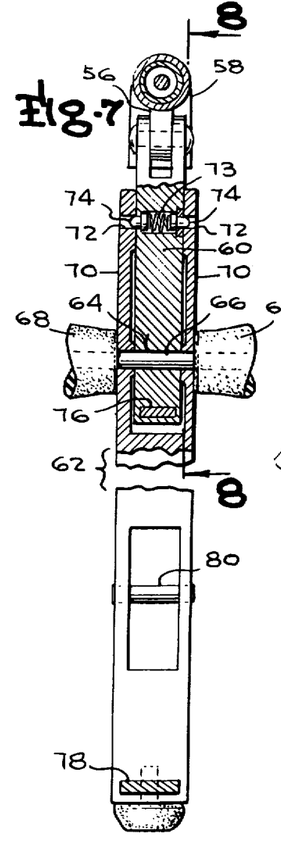
FIG. 7 is an enlarged partial front elevation and partial cross-sectional view of the drawbar's articulated supporting leg as viewed substantially on line 7—7 of FIG. 4.

To provide the cart with normal attitude at-rest support (as shown in FIGS. 1 and 4) when the cart is not being pulled, the drawbar means D is provided with the articulated supporting leg L which will now be described in greater detail. Near a forward end portion of the basic drawbar 20 and on the underside thereof, there is provided a pivot-enabling bracket or lug 56 to which the articulated supporting leg L is pivotally or hingedly connected. This is a first pivotal connection, and it enables the composite leg L to be readily folded between the solid line forwardmost position shown in FIG. 4, where the dotted line fully retracted position R. The bracket or lug 56 may be in the form of a web member welded to the drawbar member or it may be in the form of a strap member encircling the drawbar member pinched together to form a removable clamp member thereon. A suitable stop bracket 58 (FIGS. 4, 7 and 8) limits the forward travel of the leg L, and is preferably an integral part of the lug 56. FIGS. 7 and 8 show enlarged details of one feasible construction.

Figure 10:
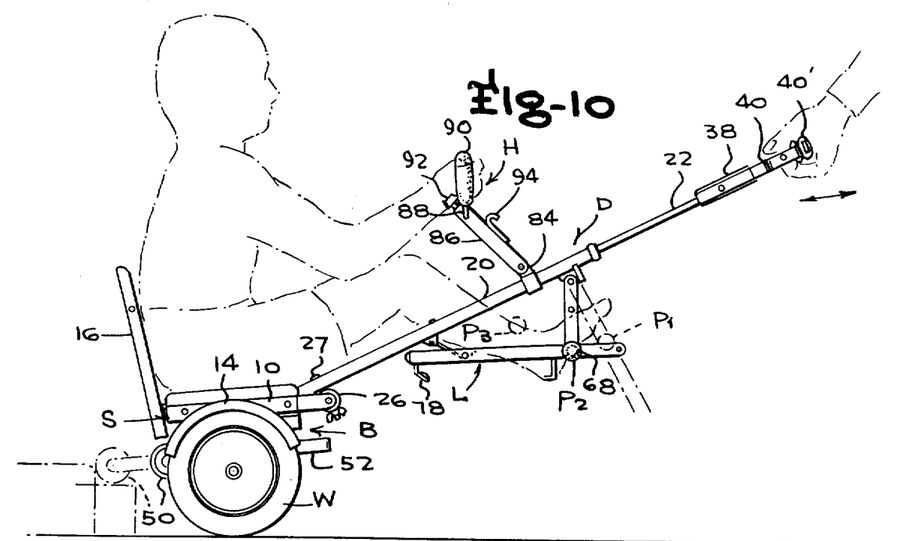
FIG. 10 is a side elevational view of the cart assembly showing the articulated support leg folded at both pivotal folding areas and attached in a predetermined relation to said drawbar means to provide a second position foot rest for a child riding on the cart.

Composite leg L includes a first leg portion 60 and a second pivotal means 64 (FIGS. 7 and 8). Second pivotal means 64 includes aligned apertures in the respective leg portions and an elongated transverse combined pivot pin 66 and foot rest support means, the latter being constituted by the laterally opposed extensions thereof and preferably having attached thereto enlarged diameter foot rests 68, 68. The unique constructional and operational features of this supporting leg L provide at least three different foot rest positions designated variously P1, P2, and P3 in FIGS. 10, 4, and 16.

Preferably the second leg portion 62 is provided with a bifurcated upper portion constituted by parallel leg extensions 70, 70 having opposed apertures 72, 72. The lower and intermediate portions of the depending first leg portions 60 are sandwiched between the said leg extensions 70, 70 when the leg portions are in their coextensive relationship. The first leg portion 60 is provided with a pair of laterally directly, oppositely and resiliently biased detents 74, 74 (FIG. 7) disposed in a transverse aperture of the first leg portion and aligned with the aforementioned apertures 72, 72 of the second leg's extensions 70, 70. A compressible spring 73 is preferably interposed between the detents 74, 74 so as to bias them apart an amount predetermined by the step construction of the aperture and detents and retention snap ring assembly thereof. This arrangement enables the outer rounded ends of the detents to project only slightly into the corresponding aperture 72, 72 to form a releasable lock or breakaway connection for the two leg portions responsive to the application of the requisite pressure.

The lower end of the first leg portion 60 is preferably provided with a forwardly projecting, hooked, hand-engageable bracket 76. Bracket 76 is adapted to be hand-held to stablize the first leg portion 60, while applying a rearwardly directed pressure to the lowermost end of the second leg portion 62, preferably via a foot-engageable bracket 78. In this manner, the jointed leg portions are unlocked when the lower or second leg portion folding rearwardly about the pivot pin 66, as shown variously in FIGS. 4, 10 and 16.

Figures 16, 17, 18, 19, 20:
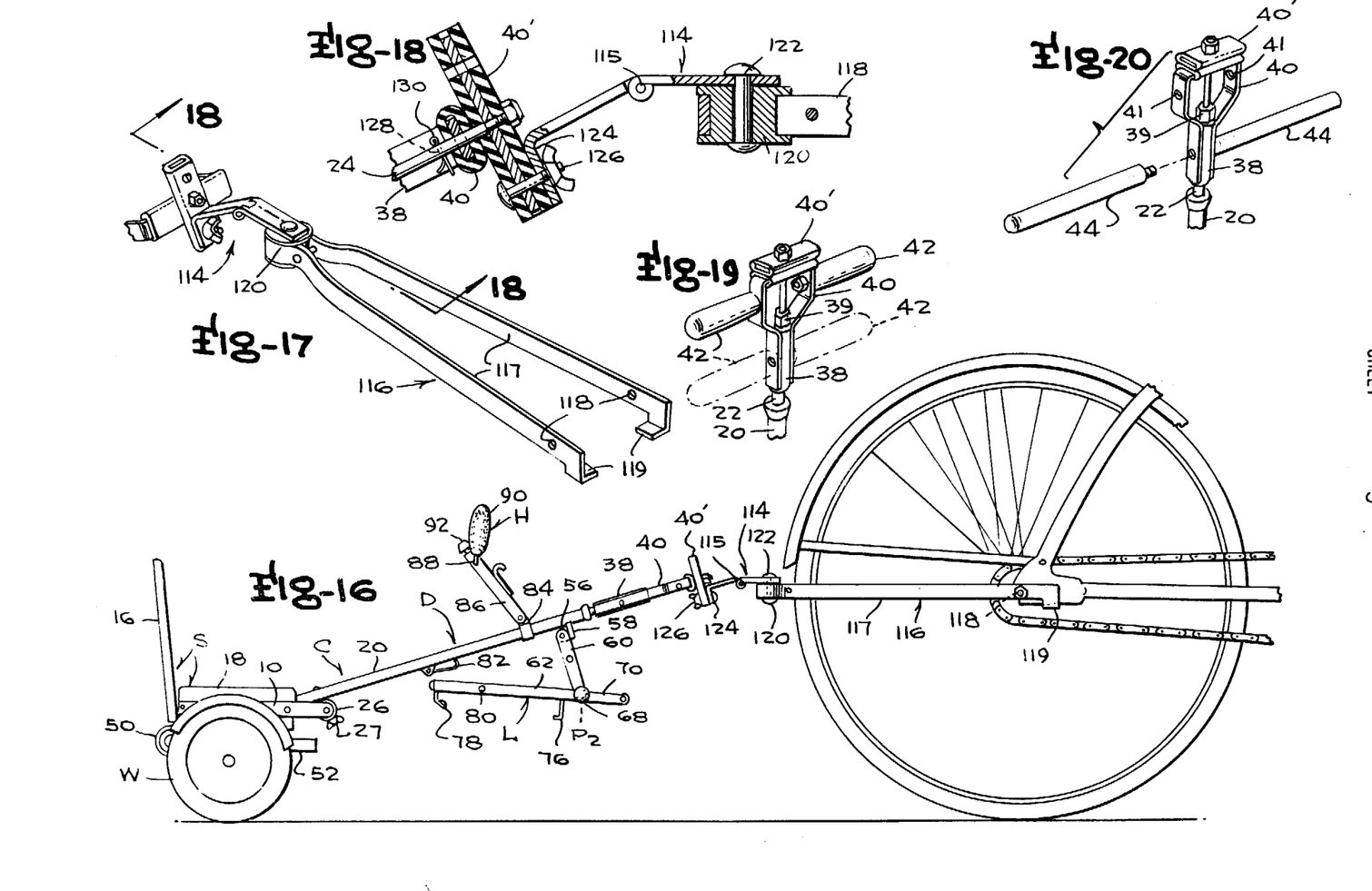
FIG. 16 is a further side elevational view of the cart shown in FIG. 10, but shown in conjunction with a universal type connector and bicycle-attaching bracket means to enable the cart to be towed thereby.
FIG. 17 is an enlarged perspective view of the attachment bracket and swivel or universal type connector means for connecting the handle to the bicycle bracket.
FIG. 18 is an enlarged cross-sectional view taken along 18—18 of FIG. 17.
FIG. 19 is a further fragmentary perspective view showing auxiliary handle bars attached to the drawbar handle to facilitate towing of the cart by two persons in side-by-side fashion.
FIG. 20 is a similar perspective view of the handle and of the tow bar or drawbar means showing auxiliary elongated supported bars removably attachable to a forward end portion of the handle as an alternative to the auxiliary frame shown in FIGS. 12–15.

With the legs folded as shown in FIG. 16, the foot rests 68, 68 are disposed in the position P2. The folded back second leg portion 62 and the main drawbar portion 20 are provided respectively with a suitable catch 80 and swingable hook means 82 to facilitate releasably folding the leg L in the variously folded back positions providing the selective foot rest positions P2 and P3.

When the cart is used as a child's stroller, suitable handle or handle bar means H are utilizable and will be described in more detail. Handle bar means H preferably includes a hinge bracket 84 adjustably and removably mounted on the main drawbar member 20 in any suitable manner, and an arm member 86 having one end pivotally connected to the bracket 84. A screw-and-wing-nut assembly 87 (FIGS. 1 and 2) is preferably used for effecting the pivotal and adjustable connection of the bracket 84 and member 86 to the main drawbar member 20. The other free end of arm member 86 is transversely apertured to adjustably receive a rod-like handle bar 88 having the ends thereof bent forwardly toward the seat or support assembly S. Hand grips 90, 90 may be attached in any one of several conventional ways. A knobbed adjustment screw 92 permits manual, limited elevational adjustment of the handle bar 88 while movement of the hinge bracket or clamp 84 on the drawbar 20 provides a fore-and-aft adjustment thereof. Enlarged details of this are shown in the fragmentary drawing FIG. 9. The components are devised so that by varying the pressure on the wing nut and screw assembly 87, the arm 86 may be angularly changed to provide for a limited amount of adjustment, thereby usually avoiding any need to shift the hinge bracket 84 axially along the drawbar 20, once the basic position is established by one's needs.

The arm member 86 is further preferably provided with at least one hook member 94 (FIGS. 1 and 11) on which to hang parcels or shopping bags, as shown in the illustrative manner depicted in FIG. 11. While bracket 84 provides some adjustment of this hook, it is understood that the hook may be further adjustably attached to the arm 86 if desired. The whole handle bar means H may be removed if desired or required, such as when using the utility cart for moving luggage, or the like, by use of the auxiliary bracket means shown in FIGS. 12-15 and which will now be described.

Figures 12, 12A, 13, 14, 15:
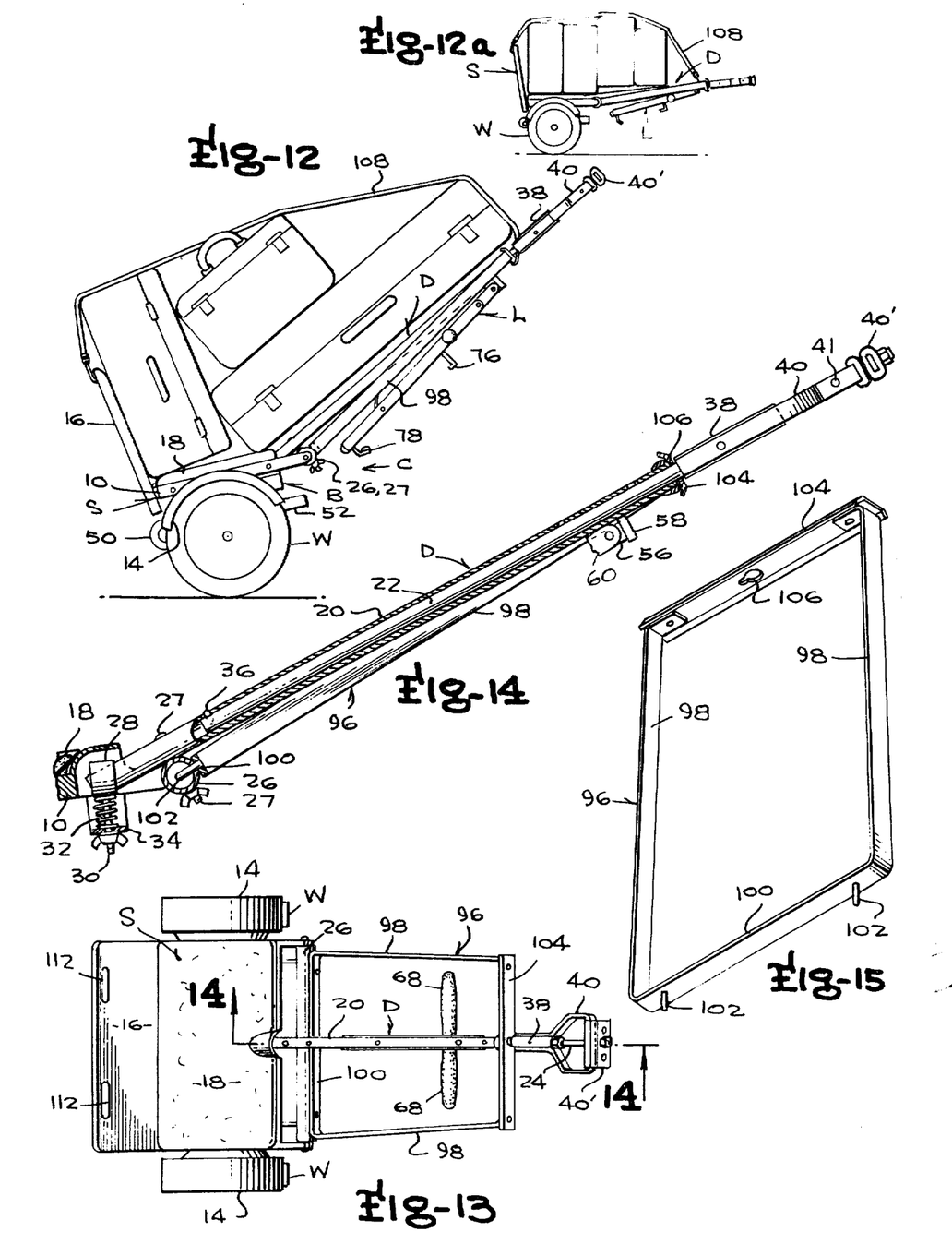

FIG. 15 is a perspective view of one feasible form of such an auxiliary bracket assembly, generally designated 96. Bracket assembly 96 preferably is generally rectangular and made of a rigid but light weight open center strap-like construction. The bracket has laterally opposite sides 98, 98, a rearward side 100 having laterally spaced pins 102, and a forward side 104 apertured at 106. The bracket assembly 96 may be assembled to the cart by first temporarily removing the auxiliary drawbar portion 22 and related handle components 38, 40, 24 and 40', thereby enabling the aperture 106 to be aligned with the open end of the drawbar 20 to receive therethrough the re-assembly of auxiliary drawbar member 22. A keyway style aperture 106 may be used to provide for easier assembly and disassembly passage of the spring biased detent 36. The bracket 36 is then oriented so that pins 102, 102 project into complementary apertures provided in the transverse tubular body member 26, better seen in FIG. 14. The arrangement is such that sides 98 of the bracket assembly 86 are generally coplanar with each other and/or with the drawbar 20 to provide an enlarged support means forwardly of the planar seat or support member 10. By this arrangement, several additional parcels or pieces of luggage can be readily handled by this utility cart. Alternatively to the use of an aperture in the forward side 104, the forward side may contain a centrally disposed saddle-like construction to rest upon the top of the drawbar without requiring the disassembly aforementioned.

Preferably the cart body B is provided with storage means for a pair of flexible and at least partially elastically expansible tie-down cords 108 (FIGS. 2 and 4). The cord storage means may be in the form of rod or spool-like members 10 (FIGS. 2, 4 and 5) depending from the underside of the first support member 10. The cords 108 are then optionally available to better stabilize and retain luggage or other articles being carried on the cart. Hooks provided on one end of the cord ends can be readily attached via slots 112 (FIGS. 1 and 13) provided in the seat back or second planar support member 16. Hooks on the other ends of the cords can be operatively attached in any suitable manner to the drawbar assembly D. FIGS. 12 and 12a depict two examples of luggage carrying use of the cart.

Reference will now be made to FIGS. 16-18, which illustrate the cart assembly C in conjunction with another of its accessory brackets to enable the cart to be attached to and pulled by a vehicle. More particularly, there is shown a first bracket means 114 having universal swivel or pivoting characteristics, and a second bracket means 116 used collectively therewith for feasibly attaching the cart to a vehicle of the bicycle type. The second vehicle attachable bracket means 116 is of the elongated forked leg type having preferably symmetrical legs 117, 117. Legs 117 have their forward ends provided with apertures 118, 118 for connection with the rear axle of the bicycle, and are preferably further provided with inwardly turned depending lugs 119, 119 adaptable to engage the undersides of the rearward fork portions of the bicycle frame. Legs 117, 117 are unitarily connected together at their rearward portions with each other and also with a vertically apertured bracket portion 120. A vertically disposed pivot pin 122 connects the first bracket means 114 to the second bracket means 116, and provides for the laterally swinging movement between the two bracket means. The first bracket means 114, as attached thereto, provides for vertical swinging movements between the composite hinge portions thereof about the horizontal hinge pin 115. The end of the first bracket means 114 opposite that connectable with the vertically disposed pivot pin 122 is suitably formed to facilitate its connection with the drawbar handle 40. Such a construction may include preferably an angular and apertured end portion 122 for selective attachment to and detachment from the apertured ancillary handle portion 40', as by bolt and wing nut assembly 126. As can be seen in the drawings, the ancillary handle portion 40' is rotated 90° relative to the main handle 40 to expose either of the handle's apertures for connection with the bracket by said bolt-and-wing nut assembly 126.

The third rod-like extension 24 of the composite drawbar D is preferably provided with one or more transverse apertures 128 (FIG. 18) near its forward end and intermediate portion to receive a cotter pin 130, if desired to selectively hold the extension rod 24 either in its telescopically closed relationship to the drawbar 20, or in some intermediate extensible stage. Therefore, it is apparent that the utility cart may be conveniently towed by a bicycle by means of the aforedescribed bracket accessories. Any other suitable from of bracket means, such as a ball hitch type, may be utilized to selectively attach the cart to either bicycle or automobile type vehicles.

From the foregoing detailed description and illustrative drawings, it is apparent that a novel combination utility cart and child's stroller has been devised which achieves all of the stated objectives and advantages set forth in the preamble and elsewhere throughout the specification.

It is also apparent that further modifications and changes may be made by those skilled in this art to various facets of the foregoing disclosed utility cart without departing from the inventive concept and spirit thereof. One such revision may embody providing the cart with more than one pair of wheels, such as providing possibly a third smaller wheel or roller means or a pair of wheels in conjunction with the articulated leg L. Therefore, reference should be made to the accompanying claims for a definition of the inventive scope hereof.

What is claimed is:

1. A collapsible, portable, hand-and-vehicle-pullable utility cart and child's stroller comprising in combination:
   a. cart body means including a generally planar first supporting member disposable selectively at both generally parallel and transverse attitudes relative to a supporting surface on which the cart is used, said body means also having at least two axially aligned supporting wheels rotatably connected thereto;
   b. said cart body means including a second generally planar supporting member pivotally connected adjacent a rearwardmost side of said first-mentioned generally planar supporting member and disposed to be foldable toward and away therefrom; said first-mentioned planar supporting member constituting a seat portion for a child to ride upon; said second planar member constituting both a seat back and a transverse rearwardmost support for any items carried in association with said first-mentioned supporting member; and said seat and seat back members having complementary abutment portions and link means for maintaining predetermined selective relative adjusted positions between fully open and folded close positions;
   c. drawbar means including a longitudinally extended drawbar attached to a forward side of said cart body means and having a free end projecting forwardly therefrom;
   d. an articulated cart-supporting leg having one end pivotally connected to said drawbar means at a point spaced forwardly of said cart body means, with the other end operatively engageable on the cart-supporting surface to maintain the cart in a stabilized, normal utility use condition when at rest on said wheels and not being pulled;
   e. child's foot-supporting members attached to said articulated supporting leg;
   f. said articulated supporting leg being of composite form including second pivotal means interconnecting first and second composite-forming leg portions so as to facilitate selective relative folding movement of said leg portions; cooperative means on mid-leg portions to releasably lock them in rigid coextensive aligned conditions; and
   g. said pivotally connected supporting leg disposed so as to be adjusted between a forwardmost extended cart-stabilizing position and a rearwardly folded or retracted cart-pulling position, attendant movement of said cart supporting leg about said pivotal connection with said drawbar means.

2. A cart as defined in claim 1, wherein said articulated supporting leg is of composite form, and includes second pivotal means connecting first and second composite-forming leg portions together; said first pivotal connection and said second pivotal means of said supporting leg being so interrelated so as to cooperatively facilitate the selective adjustment of said foot supporting members in a predetermined position when said first and second leg portions are folded at approximately 90° relative to one another; and cooperating means on said drawbar means and on said articulated supporting leg to releasably lock said second leg portion to said drawbar means.

3. A cart as defined in claim 1, wherein said longitudinally extended drawbar includes a relatively fixed main drawbar and a relatively telescopically extensible and retractable auxiliary drawbar member cooperatively disposed therewith.

4. A cart as defined in claim 1, wherein said drawbar includes handle means attached to said free end thereof in a manner facilitating 360° free relative movement of said handle means about the longitudinal axis thereof.

5. A cart as defined in claim 1, further including adjustable transverse handle bar means attachable to said drawbar means for a child to hold on to when using the cart as a child's stroller.

6. A cart as defined in claim 1, further including a pair of auxiliary hand-grip members selectively attachable to and near the free end which is a forward end of said drawbar means, and said hand-grip members projecting transversely laterally from opposite sides thereof to facilitate easier collective pulling of said cart by two persons in side-by-side fashion.

7. A cart as defined in claim 1, wherein said cart body includes means on and selectively extensible behind said body to materially reduce the distance of fall or drop of the cart when pulled down over steps and over sidewalk or road curbs.

8. A cart as defined in claim 1, wherein said articulated cart-supporting leg includes a bracket attached toward a lowermost end thereof to facilitate remote actuating movement of said supporting leg by the user's toe portion of the foot when placed in engagement therewith and drawn forwardly and/or pushed rearwardly about said pivotal connection with the drawbar as needed.

9. A cart as defined in claim 1, wherein said drawbar means is a component detachably connected to said cart body, and said cart and its related components are all of a size to be readily stored within and carried by a hand-held openable-and-closeable carrying bag.

10. A cart as defined in claim 1, wherein said elongated drawbar includes one end opposite the free end connectable with said cart body means, and said cart body means and said drawbar means include cooperative interengagement means for facilitating an adjustable connection of and a variable angle relationship for said drawbar means relative to said cart body.

11. A cart as defined in claim 1, further including a hook thereon operatively connected to said drawbar means and spaced from said relatively foldable planar support members to accomodate handles of a shopping bag being carried by said cart and supported collectively thereby and by said relatively foldable planar support members when the cart is positioned with the drawbar means in a generally upright or vertical condition.

12. A cart as defined in claim 1, further including at least one flexible and elastically expansible tie-down cord stored on means provided on said cart body, and means on said cart and cord ends for removably connecting at least one end thereof to said cart body means and the other end operatively to the said drawbar means after overlaying one or more items to be carried upon said cart.

13. A cart as defined in claim 12, further including a separate auxiliary frame member with means for attaching same to said cart body means and said drawbar means, said auxiliary frame member forming an auxiliary support forwardly beyond said first planar supporting member and providing generally coplanar laterally supporting surfaces at opposite sides of said drawbar means, to thereby increase the carrying utility of said cart when carrying multiple pieces of baggage and the like of the collective area size greater than that of said first-mentioned planar supporting member.

14. A cart as defined in claim 13, wherein one side of said auxiliary frame and cart body have cooperating male and female engagement parts, and said auxiliary frame and drawbar means have additional cooperative interengagement means to support a forwardmost side of said auxiliary frame at a point spaced forwardly apart from said male and female engagement parts when said auxiliary frame is assembled with the said cart.

15. A cart as defined in claim 1, further including link means for releasably connecting said second planar supporting member in a predetermined relationship relative to said first-mentioned planar supporting member or seat portion.

16. A cart as defined in claim 15, wherein said link means includes a first relatively short link member pivotally connected to one of said two planar supporting members and releasably connectable with the other to releasably lock same in closely continuous relationship; and said link means further including a substantially longer link member similarly connected to said planar supporting members for releasably locking said members in selectively greater apart angularly disposed relationship.

17. A cart as defined in claim 1, wherein said articulated cart-supporting composite leg includes a first bracket attached to and near a lowermost end of said second leg portion, and a second bracket attached to and near the end of first leg portion nearest said second pivotal means; said second pivotal means including resilient-biased means to releasably lock said leg portions together in coextensive relationship to preclude undesirable and unwanted pivoting relationship therebetween; said first and second bracket means adapted to be operativety engaged by a foot and hand respectively of the user of the cart to effect pivotal movement of said second leg portion relative to said first leg portion during adjustment of said foot-supporting members.

18. A cart as defined in claim 1, further including a universal type connecting device and vehicle attachable bracket means connectable with said universal type connecting device to facilitate towing of said cart by a vehicle.

19. A cart as defined in claim 18, wherein said vehicle-attachable bracket means is of an elongated forked leg bracket type having a bight portion to which said universal type connecting device is releasably attachable, and said forked leg portions of the bracket having means for removably attaching them in a stabilized manner to a rear axle and rear frame portion of a bicycle frame when a bicycle type vehicle is used to tow the cart.

* * * * *